(12) United States Patent
Smith

(10) Patent No.: US 7,236,299 B1
(45) Date of Patent: Jun. 26, 2007

(54) COMPACT PERISCOPIC BEAM DIRECTOR

(75) Inventor: M. James Smith, Lexington, MA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 11/402,520

(22) Filed: Apr. 11, 2006

(51) Int. Cl.
*G02B 23/08* (2006.01)

(52) U.S. Cl. ............... 359/402; 359/211; 359/403; 359/405

(58) Field of Classification Search ........ 359/402–406, 359/211
See application file for complete search history.

(56) References Cited

U.S. PATENT DOCUMENTS

| | | | |
|---|---|---|---|
| 3,974,985 A | 8/1976 | Campbell et al. | |
| 4,008,371 A | 2/1977 | Barron | |
| H341 H * | 10/1987 | Mongeon | 356/139.08 |
| 5,529,261 A | 6/1996 | Iddan | |
| 5,610,771 A * | 3/1997 | Sigler | 359/832 |
| 5,815,302 A * | 9/1998 | McVey et al. | 359/214 |
| 6,343,767 B1* | 2/2002 | Sparrold et al. | 244/3.16 |
| 6,344,937 B1* | 2/2002 | Sparrold et al. | 359/837 |
| 6,549,700 B1 | 4/2003 | Sweatt et al. | |
| 2001/0013565 A1 | 8/2001 | Daviovitch | |
| 2005/0249502 A1* | 11/2005 | Chen et al. | 398/118 |
| 2006/0279827 A1* | 12/2006 | Hutchin et al. | 359/211 |

OTHER PUBLICATIONS

Degnan, John J., "Ray Matrix Approach for the Real Time Control of SLR2000 Optical Elements", Sigma Corporation, Jun. 7-11, 2004, [online] [retrieved on Jul. 24, 2006]. Retrieved from the Internet <URL: http://www.roa.es/14workshop-laser/presentations/9%20June,%20Wednesday/1400-1530%20Automation%20and%20Control/1.Ray%20Matrix%20Approach%20for%20the%20Real%20Time%20Control%20of%20SLR2000%20Optical%20Elements.ppt>. pp. 1-19.

* cited by examiner

*Primary Examiner*—Mark A. Robinson
*Assistant Examiner*—Lee Fineman
(74) *Attorney, Agent, or Firm*—Maine & Asmus

(57) ABSTRACT

A periscopic beam director is disclosed. The periscopic beam director can be configured with a hemispheric field of regard, in a volume that minimizes external structure or dome size when mounted on a host vehicle (e.g., airplane or UAV). One embodiment combines a Risley Prism refractive beam steering arrangement with an angled azimuthal mount. By using refraction in combination with reflection for changing the beam direction within an optical unit, a substantially more compact periscopic beam director can be realized.

20 Claims, 2 Drawing Sheets

COMPACT PERISCOPIC BEAM DIRECTOR

FIELD OF THE INVENTION

The invention relates to optics, and more particularly, to a compact periscopic beam director.

BACKGROUND OF THE INVENTION

Periscopic beam directors have generally been designed as all-reflective systems, for applications that must handle a wide spectral range. Example such applications include a beam-director mounted on the surface of a host vehicle. In such applications, the beam director typically is mounted proximate a cutout in the frame of the host vehicle.

An optical dome is mounted over the cutout, so as to allow the beam director to extend beyond the cutout, so that the beam director can view its field of regard. The optical dome also operates to protect the optics, and to maintain host vehicle pressure seal (e.g., for high altitude deployment).

In order to fold the light around within the outer dome, periscopic beam directors generally require a dome with an inner diameter at least 4 to 5 times the diameter of the clear aperture (sometimes referred to as free aperture or objective aperture) of the optical beam. As is known, the clear aperture is the opening in the mount of an optical system that restricts the extent of the rays incident on the given surface. The clear aperture is typically circular and specified by its diameter.

What is needed, therefore, is a periscopic beam director with a hemispheric field of regard, in a volume that minimizes external structure or dome size when mounted on a host vehicle.

SUMMARY OF THE INVENTION

One embodiment of the present invention provides a method for manufacturing a periscopic beam director. The method includes providing a Risley prism assembly having a rotation axis, and providing an azimuthal rotation axis. The method further includes providing a folded optical path that includes the Risley prism rotation axis and the azimuthal rotation axis. The method further includes mounting the Risley prism assembly at an angle $\theta$ to the azimuthal rotation axis, and providing a mechanism to rotate the Risley prism assembly and folded optical path about the azimuthal rotation axis. In one such embodiment, the Risley prism assembly includes inner and outer rotation tubes each operatively coupled to a corresponding Risley prism at one end, and to a corresponding motor assembly having an integrated angular sensor at the other end. In another particular case, the azimuthal rotation axis is substantially perpendicular (e.g., +/−5 degrees) to a host vehicle surface and optical dome center. In another particular case, the folded optical path includes a pair of optical mirrors. In one such case, the azimuthal rotation axis is coincident with a first segment of the folded optical path incident to one of the mirrors, and the Risley prism rotation axis is coincident with a second segment of the folded optical path reflected from the other mirror (e.g., for scanning operations). In another such case, the azimuthal rotation axis is coincident with a first segment of the folded optical path reflected from one of the mirrors, and the Risley prism rotation axis is coincident with a second segment of the folded optical path incident to the other mirror (e.g., for detecting operations). The mechanism to rotate the Risley prism assembly and folded optical path about the azimuthal rotation axis may include, for example, a motor assembly configured with a 360 degree rotation capability about the azimuthal rotation axis. An angular sensor assembly (or other suitable parameter sensor) can be integrated with the motor assembly, or can exist independently.

Another embodiment of the present invention provides a periscopic beam director system. The system includes an azimuthal rotation axis. This axis may be, for example, substantially perpendicular (e.g., +/−5 degrees) to a host vehicle surface and optical dome center. The system can be mounted proximate the optical dome, so as to provide access to a field of regard outside the host vehicle. The system further includes a Risley prism assembly having a rotation axis, wherein the Risley prism assembly is mounted at an angle $\theta$ to the azimuthal rotation axis. The system further includes a folded optical path that is coincident or otherwise includes the Risley prism rotation axis and the azimuthal rotation axis. The system may further include a mechanism to rotate the Risley prism assembly and folded optical path about the azimuthal rotation axis. In one such case, the mechanism to rotate the Risley prism assembly and folded optical path about the azimuthal rotation axis includes a motor assembly configured with a 360 degree rotation capability about the azimuthal rotation axis. An angular sensor assembly can be integrated with the motor assembly, if so desired. The Risley prism assembly may include, for example, inner and outer rotation tubes each operatively coupled to a corresponding Risley prism at one end, and to a corresponding motor assembly having an integrated angular sensor at the other end. In one particular case, the folded optical path includes a pair of optical mirrors. In one such case, the azimuthal rotation axis is coincident with a first segment of the folded optical path incident to one of the mirrors, and the Risley prism rotation axis is coincident with a second segment of the folded optical path reflected from the other mirror (e.g., for scanning operations). In another such case, the azimuthal rotation axis is coincident with a first segment of the folded optical path reflected from one of the mirrors, and the Risley prism rotation axis is coincident with a second segment of the folded optical path incident to the other mirror (e.g., for detecting operations).

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

A periscopic beam director is disclosed. The periscopic beam director can be configured with a hemispheric field of regard, in a volume that minimizes external structure or dome size when mounted on a host vehicle.

An embodiment of the present invention combines a Risley Prism refractive beam steering arrangement with an angled azimuthal mount, to achieve optomechanical performance not obtained with either element alone. By using refraction in combination with reflection for changing the beam direction within an optical unit, a substantially more compact periscopic beam director can be realized. Being periscopic in nature, the beam director requires no internal magnification. However, internal magnification can be used if so desired.

As previously explained, with conventional periscopic beam directors, dome diameters must be approximately 4 times (or greater) than the optical beam diameter. A periscopic beam director configured in accordance with an embodiment of the present invention achieves the smallest possible (or otherwise smaller relative to conventional designs) optical dome protruding outside the surface or skin of a host vehicle (e.g., airplane or UAV), for a given optical beam size.

In one particular configuration, an implementation whose optical dome diameter is approximately 1.5 to 2 times the optical beam diameter. Thus, a reduction of about 50% to 60% (or more) in dome size is enabled.

System Architecture

Figure 1:
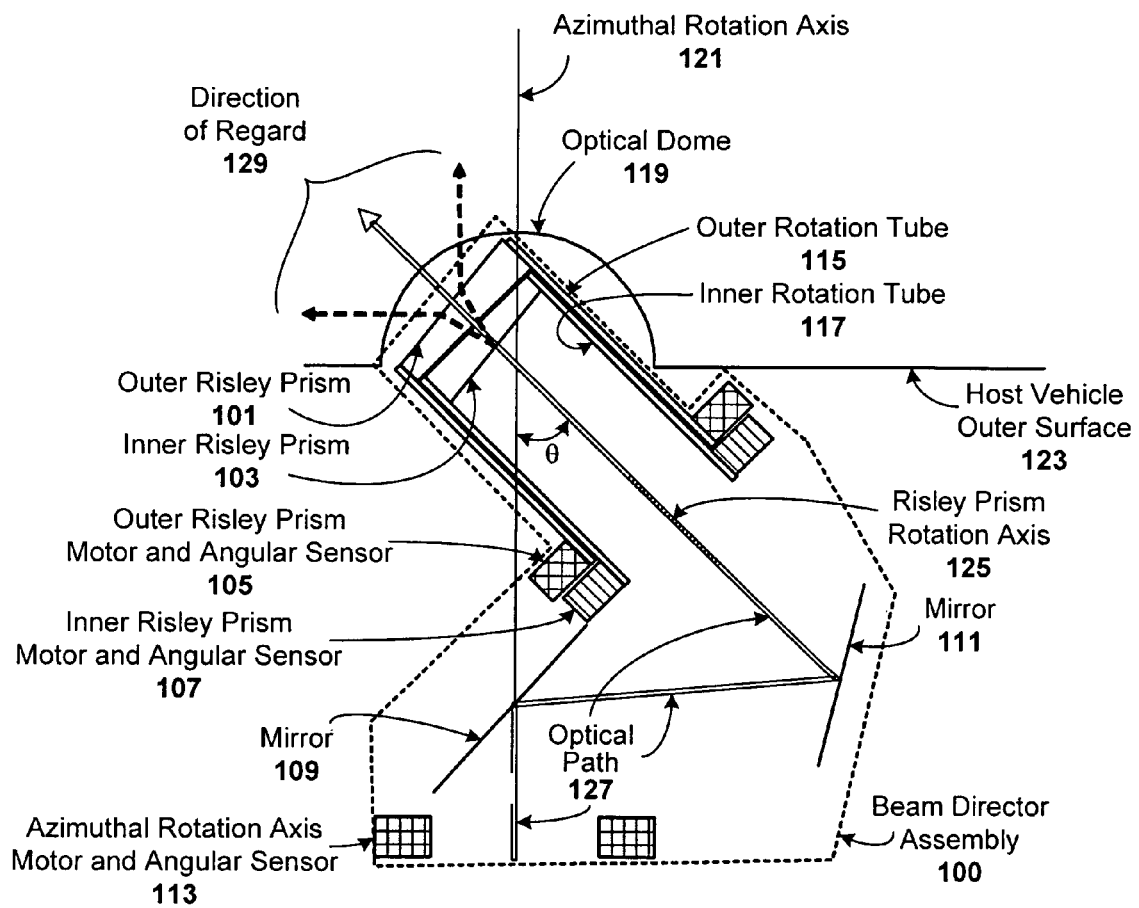
FIG. 1 is a block diagram of a periscopic beam director shown in cross-section and configured in accordance with an embodiment of the present invention.

FIG. 1 is a block diagram of a periscopic beam director 100 shown in cross-section and configured in accordance with an embodiment of the present invention.

As can be seen, components of the beam director 100 assembly are designated by the dashed line. These components are mounted to a common frame (e.g., which is welded or otherwise secured to the host vehicle), and rotate as a unit about the azimuthal rotation axis 121. The components include an outer Risley prism 101, an inner Risley prism 103, an outer rotation tube 115, an inner rotation tube 117, an outer Risley prism motor and angular sensor 105, an inner Risley prism motor and angular sensor 107, mirrors 109 and 111, and an azimuthal rotation axis motor and angular sensor 113. A folded optical path 127 is enabled.

The beam director assembly 100 is mounted to the host vehicle. A cut-out in the host vehicle outer surface 123 allows the beam director assembly 100 to access its field of regard. Optical dome 119 is provided to cover the cut-out on the host vehicle outer surface 123. In this particular case, the azimuthal rotation axis 121 runs perpendicular through the optical dome 119. The optical dome 119 can be any material that is transparent to the scanning source (e.g., glass or plastic that is transparent to infrared or laser wavelengths).

Each of the Risley prisms is connected by a rotation tube to a motor and angular sensor. In more detail, one end of the outer rotation tube 115 is connected to the outer Risley prism 101, and the other end of the outer rotation tube 115 is connected to the outer Risley prism motor and angular sensor 105. Likewise, one end of the inner rotation tube 117 is connected to the inner Risley prism 103, and the other end of the inner rotation tube 117 is connected to the inner Risley prism motor and angular sensor 107. It will be appreciated that the drive mechanisms of motors 105, 107 are connected to the rotation tubes 115, 117.

In one particular embodiment, each of the Risley prisms 101, 103 is bonded (e.g., epoxy or rubber cement) to its corresponding rotation tube 115, 117. Alternatively, each of the Risley prisms 101, 103 can be press-fitted into its corresponding rotation tube 115, 117. In a similar fashion, the other end of each rotation tube 115, 117 can be bonded or press-fitted to the drive of the corresponding motor 105, 107. Numerous connection techniques can be used here, and the present invention is not intended to be limited to any particular one.

In any such case, the motors 105, 107 each operate to rotate the corresponding rotation tube 115, 117 and prism 101, 103 assembly. The prisms 101, 103 and their two rotation tubes 115, 117, motors w/position sensors 105, 107 constitute a Risley prism assembly. Note that the prisms 101, 103, and rotation tubes 115, 117, and motors w/position sensors 105, 107 are shown in cross-section, such that each of these components can be seen on both sides of the Risley prism rotation axis 125. In this particular embodiment, it will be appreciated that the drive mechanisms of motors w/position sensors 105, 107 are effectively wrapped around (or otherwise operatively connected to) the respective rotation tubes 115, 117.

As the prisms 101, 103 rotate with respect to one another, the instantaneous beam angle or direction of regard 129 moves within a cone indicated by the dashed arrows, about the Risley prism rotation axis 125. If the two prisms 101, 103 exactly counter-rotate, the instantaneous beam angle or direction of regard 129 scans in a straight line. Depending on the wedge angle and index of refraction of the material used for each prism 101, 103, the angular extent of the scan can be up to +/−50 degrees or so from the Risley prism rotation axis 125.

As is known, a Risley optical scanning system includes two sequential wedge prisms (having wedge angles A1 and A2) that are capable of rotating about an optical scan axis at angular speeds $\omega 1$ and $\omega 2$, as shown in FIG. 1. When a focused laser beam (or other suitable scan source) is directed along the optical scan axis and through the prisms, the emergent beam is deviated in a direction according to the relative orientation of the prisms with respect to each other. When the individual Risley prisms are rotated clockwise or counterclockwise, the combined deviation angle and orientation phase change with time, such that the image spot traces out a scan pattern. Various desired scan patterns can be generated by selecting particular values for the ratios of A2/A1 and $\omega 1$ and $\omega 2$, as is known.

Various Risley prism configurations can be used here as will be apparent in light of this disclosure is well known, and the present invention is not intended to be limited to any particular one. For instance, in other embodiments, any one or both of the integrated motor w/angular sensor assemblies (components 105 and 107) can be configured as separate modules (i.e., angular sensor component can be distinct from motor).

In the embodiment shown in FIG. 1, the scan source provides a beam to optical path 127, which is folded by operation of mirror 109 and mirror 111. Note that in this example embodiment, the azimuthal rotation axis 121 is coincident with one segment of the optical path 127 incident to mirror 109, and the Risley prism rotation axis 125 is coincident with the segment of the optical path 127 that is reflected from mirror 111. The input scan beam is guided by the mirrors 109 and 111 onto the Risley prism rotation axis 125. Using a folded optical path 127 further allows for compactness of the beam director assembly 100. The guided beam then passes through the Risley prisms 101, 103 into the field of regard 129. It will be appreciated that the beam director assembly 100 can also be used as a receiver, where incoming beams from the field of regard is captured by the Risley prisms 101, 103, and provided to detection and/or processing circuitry (not shown) by the optical path 127. In such as case, the Risley prism rotation axis 125 is coincident with the segment of the optical path 127 that is incident to mirror 111, and the azimuthal rotation axis 121 is coincident with the segment of the optical path 127 reflected from mirror 109. Thus, the optical path 127 can be by-directional or unidirectional (e.g., for detection or scanning functions).

In this particular embodiment, the Risley prism assembly (e.g., prisms 101, 103 and their two rotation tubes 115, 117, motors w/position sensors 105, 107) and mirrors 109, 111 are configured as unit (beam director assembly 100) that can be rotated by the azimuthal rotation axis motor and angular sensor 113 about the azimuthal rotation axis 121. The Risley prism assembly is mounted at an angle θ to the azimuthal rotation axis 121. In this way, the beam deviation angle imparted by the Risley prism assembly is added to or subtracted from θ, so that the available elevation angle becomes at least 0 to 90 degrees. That, coupled with a 360 degree rotation capability about the azimuthal rotation axis 121, provides at least a 2π solid angle coverage for the beam director 100 as a whole.

Just as discussed with reference the integrated motor w/angular sensor assemblies 105 and 107, the azimuthal rotation axis motor and angular sensor 113 can be configured as separate modules (i.e., angular sensor component can be distinct from motor). Each of the motor w/angular sensors assemblies 105, 107, and 113 can be implemented with conventional or custom technology (e.g., a DC stepper motor). As is known, the speed and torque capability of the motors will depend on factors such as the total weight and weight distribution of the assembly (or sub-assembly) being moved. The step size will depend on the desired resolution of movement within the field of regard. In one particular embodiment, each of the motor w/angular sensors assemblies 105, 107, and 113 is implemented with a stepper motor that provides about a 2° to 5° step angle and 300 to 600 oz-inches of torque.

The mirrors 109 and 111, as well as the Risley prisms 101, 103 can also be implemented with conventional or custom technology. The material and size of the mirrors 109 and 111 will depend on factors such as beam power and vibration profile of the particular application. Similar factors may apply to the Risley prisms 101, 103, as well as to the desired scan pattern (e.g., based on ratios of A2/A1 and ω1 and ω2) as previously discussed.

The illustration of FIG. 1 shows one embodiment of the present invention. Numerous configurations will be apparent in light of this disclosure. For example, in alternative embodiments, the optical path 127 may also contain relay telescopes or other optical elements, to further reduce the overall size of the perioscopic beam director 100, if so desired.

Methodology

Figure 2:
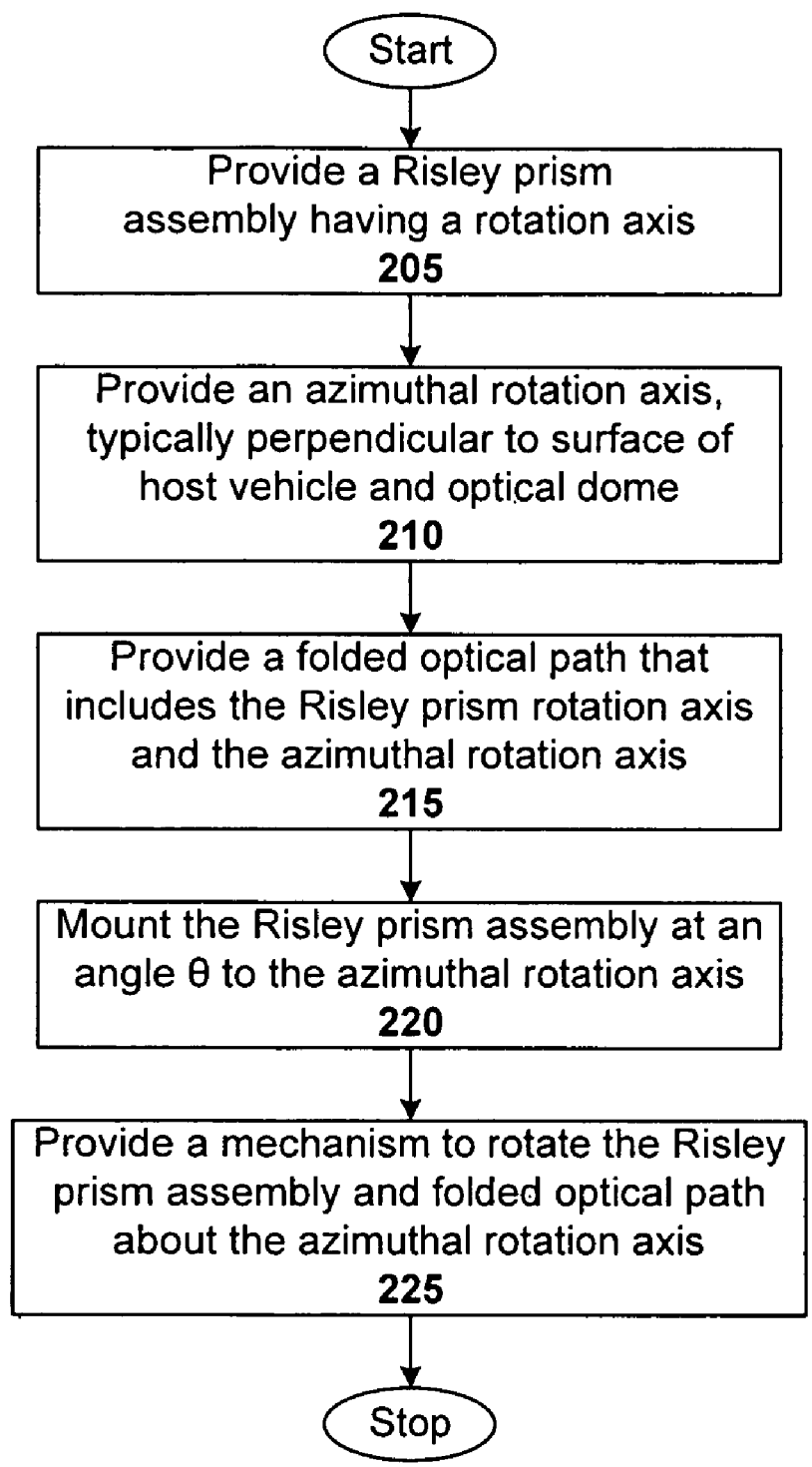
FIG. 2 illustrates a method for manufacturing a periscopic beam director, in accordance with an embodiment of the present invention.

FIG. 2 illustrates a method for manufacturing a perioscopic beam director, in accordance with an embodiment of the present invention.

The method includes providing 205 a Risley prism assembly having a rotation axis. In one particular embodiment, the Risley prism assembly is configured as previously explained, and includes inner and outer rotation tubes each operatively coupled to a Risley prism at one end, and to a corresponding motor and angular sensor assembly at the other end. Any suitable Risley prism assembly design can be employed here.

The further includes providing 210 an azimuthal rotation axis. This axis is typically perpendicular to surface of host vehicle and drop-dead center of the optical dome. However, some embodiments may have an azimuthal rotation axis that has some degree of angular offset from this perpendicular line. Parameters such as the host vehicle shape and curvature (if any) at the dome site factor into the relationship between the azimuthal rotation axis and the perpendicular line that runs through the drop-dead center of the optical dome. Any such relationships can exploit the benefits of a beam director as described herein.

The method further includes providing 215 a folded optical path that includes the Risley prism rotation axis and the azimuthal rotation axis. In one such case, the folded optical path is provided with optical mirrors, as discussed with reference to FIG. 1. In other embodiments, the folded optical path may also include other optical elements (e.g., relay telescopes, additional mirrors, beam shaping lens, etc) to further reduce the overall size of the beam director and/or to direct the beam on a particular desired optical path.

The method further includes mounting 220 the Risley prism assembly at an angle θ to the azimuthal rotation axis. The mounting can be carried out, for example, by any one or more of a number of known mounting techniques, including bracketing, welding, fastening (e.g., nut-and-bolt arrangement), riveting, etc. In any case, note that this mounting will respect and maintain the intended relationship between the azimuthal rotation axis and the perpendicular line that runs through the drop-dead center of the optical dome. As previously explained, the azimuthal rotation axis may be coincident with the perpendicular line that runs through the drop-dead center of the optical dome, but need not be.

The method further includes providing 225 a mechanism to rotate the Risley prism assembly and folded optical path about the azimuthal rotation axis. Any motor assembly can be used here. An angular sensor (or other desired parameter sensor) can be integrated with the motor assembly, or exist independently of the motor, as previously explained. In one particular embodiment, a 360 degree rotation capability about the azimuthal rotation axis is provided by the mechanism. This full-rotation capability, in conjunction with the Risley prism assembly being mounted at an angle θ to the azimuthal rotation axis, provides at least a 2π solid angle coverage for the perioscopic beam director as a whole.

Thus, robust scanning operations are enabled. Note that the perioscopic beam director can also be used for detection, depending on the given application. In this sense, the optical path can be bi-directional for both scanning (e.g., where light is transmitted out of the host vehicle) and detecting functions (e.g., where light is received by the host vehicle). The source module (and related processing componentry) and/or detection module can be implemented with conventional or custom technology, and be operatively coupled to the optical path as typically done.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for manufacturing a perioscopic beam director, comprising:
   providing a Risley prism assembly having a rotation axis and beam deviation angle such that said perioscopic beam director has a solid angle coverage of at least 2π steradians;
   providing an azimuthal rotation axis;
   providing a folded optical path that includes the Risley prism rotation axis and the azimuthal rotation axis;
   mounting the Risley prism assembly at an angle θ to the azimuthal rotation axis; and providing a mechanism to rotate the Risley prism assembly and folded optical path about the azimuthal rotation axis.

2. The method of claim 1 wherein the Risley prism assembly includes inner and outer rotation tubes each operatively coupled to a corresponding Risley prism at one end, and to a corresponding motor assembly having an integrated angular sensor at the other end.

3. The method of claim 1 wherein the azimuthal rotation axis is substantially perpendicular to a host vehicle surface and an optical dome center.

4. The method of claim 1 wherein the folded optical path includes a pair of optical mirrors.

5. The method of claim 4 wherein the azimuthal rotation axis is coincident with a first segment of the folded optical path incident to one of the mirrors, and the Risley prism rotation axis is coincident with a second segment of the folded optical path reflected from the other mirror.

6. The method of claim 4 wherein the azimuthal rotation axis is coincident with a first segment of the folded optical path reflected from one of the mirrors, and the Risley prism rotation axis is coincident with a second segment of the folded optical path incident to the other mirror.

7. The method of claim 1 wherein the mechanism to rotate the Risley prism assembly and folded optical path about the azimuthal rotation axis includes a motor assembly configured with a 360 degree rotation capability about the azimuthal rotation axis.

8. The method of claim 7 wherein an angular sensor assembly is integrated with the motor assembly.

9. A periscopic beam director system, comprising:
an azimuthal rotation axis;
a Risley prism refractive beam steering assembly having a rotation axis, wherein the Risley prism refractive beam steering assembly is mounted at an angle θ to the azimuthal rotation axis;
a folded optical path that includes the Risley prism rotation axis and the azimuthal rotation axis;
a mechanism to rotate the Risley prism refractive beam steering assembly and folded optical path about the azimuthal rotation axis; and
said Risley prism refractive beam steering assembly having a deviation angle added to said angle θ such that a beam directed by said perioscopic beam director system has an available elevation angle from at least 0° to 90° and said periscopic beam director system provides solid angle coverage of at least 2π steradians.

10. The system of claim 9 wherein the Risley prism refractive beam steering assembly includes inner and outer rotation tubes each operatively coupled to a corresponding Risley prism at one end, and to a corresponding motor assembly having an integrated angular sensor at the other end.

11. The system of claim 9 wherein the azimuthal rotation axis is substantially perpendicular to a host vehicle surface and an optical dome center.

12. The system of claim 9 wherein the folded optical path includes a pair of optical mirrors.

13. The system of claim 12 wherein the azimuthal rotation axis is coincident with a first segment of the folded optical path incident to one of the mirrors, and the Risley prism rotation axis is coincident with a second segment of the folded optical path reflected from the other mirror.

14. The system of claim 12 wherein the azimuthal rotation axis is coincident with a first segment of the folded optical path reflected from one of the mirrors, and the Risley prism rotation axis is coincident with a second segment of the folded optical path incident to the other mirror.

15. The system of claim 9 wherein the mechanism to rotate the Risley prism refractive beam steering assembly and folded optical path about the azimuthal rotation axis includes a motor assembly configured with a 360 degree rotation capability about the azimuthal rotation axis.

16. The system of claim 15 wherein an angular sensor assembly is integrated with the motor assembly.

17. A periscopic beam director system, comprising:
an azimuthal rotation axis that is substantially perpendicular to a host vehicle surface and an optical dome center;
a Risley prism assembly having a rotation axis, wherein the Risley prism assembly is mounted at an angle θ to the azimuthal rotation axis; and
a folded optical path having a first segment that is coincident with the Risley prism rotation axis and a second segment coincident with the azimuthal rotation axis, said first segment being, said first and second segments being disposed at opposite ends of a third optical path segment not coincident with either the Risley prism axis or the azimuthal rotational axis.

18. The system of claim 17 further comprising:
a mechanism to rotate the Risley prism assembly and folded optical path about the azimuthal rotation axis.

19. The system of claim 18 wherein the mechanism to rotate the Risley prism assembly and folded optical path about the azimuthal rotation axis includes a motor assembly configured with a 360 degree rotation capability about the azimuthal rotation axis.

20. The system of claim 19 wherein an angular sensor assembly is integrated with the motor assembly.

* * * * *